(No Model.)
C. I. BURT.
AUTOMATIC STOCK FOUNTAIN.
No. 474,986. Patented May 17, 1892.
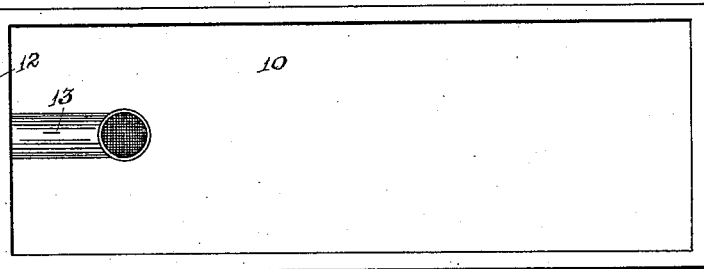
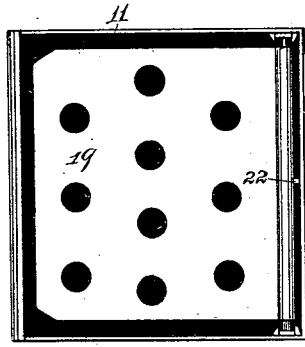
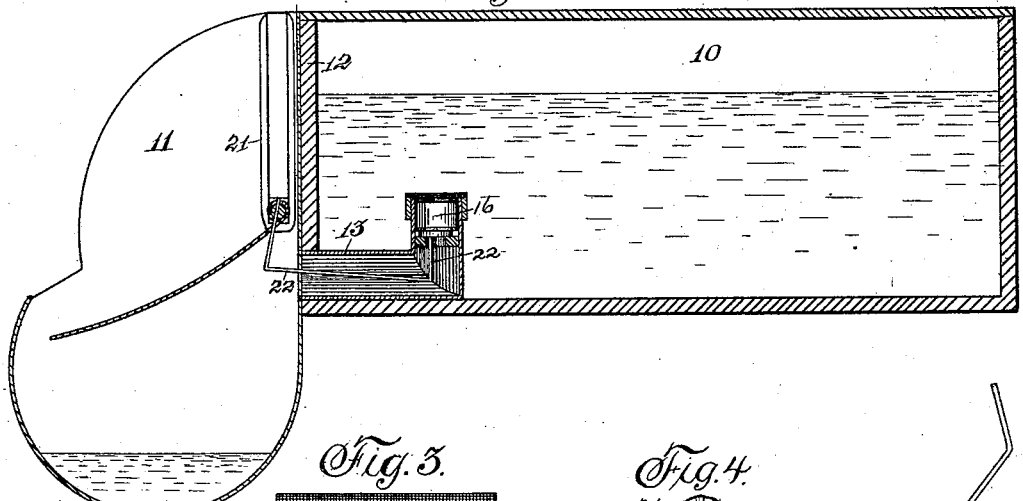
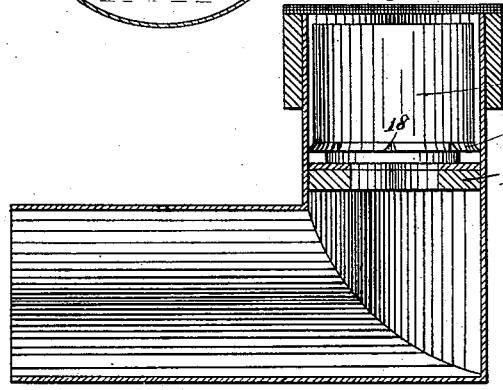
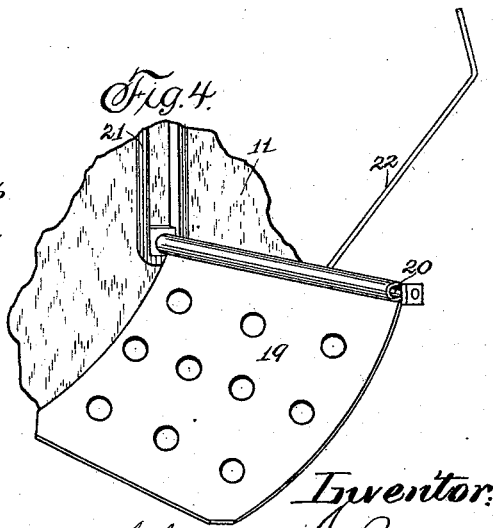
Witnesses:
F. E. Tate.
G. R. Green.
Inventor:
Chauncey I. Burt,
by Bulkley & Sweet,
his Att'ys.

UNITED STATES PATENT OFFICE.

CHAUNCEY I. BURT, OF JEFFERSON, IOWA.

AUTOMATIC STOCK-FOUNTAIN.

SPECIFICATION forming part of Letters Patent No. 474,986, dated May 17, 1892.

Application filed September 15, 1891. Serial No. 405,780. (No model.)

*To all whom it may concern:*

Be it known that I, CHAUNCEY I. BURT, a citizen of the United States, residing at Jefferson, in the county of Green and State of Iowa, have invented a new and useful Improvement in Automatic Stock-Fountains, of which the following is a specification.

My invention has for its object the provision of improved means whereby water may be caused to flow from a tank or other source of supply into a drinking-trough by the action of the animal in an attempt to obtain water from said drinking-trough, said animal coming in contact with a part of the mechanism which actuates the valvular appliances.

A further object of my invention is to assemble and relatively position the various elements or parts of the drinking-fountain in such a manner that the water is contained in bulk within a closed vessel or tank, and thus kept comparatively cool and free from deleterious substances and automatically fed to a drinking-trough in the action of the animal when desiring drink by positively-acting valvular appliances, thus insuring a renewed supply of fresh, cool, and clean water for such animal.

My invention consists in the combination, with a reservoir containing-vessel or other source of supply and a drinking-trough adjacent thereto, of a valve located within said reservoir and a conveying duct or ducts between said reservoir and the drinking-trough, lever mechanism acted upon by the animal in an attempt to obtain drink within the drinking-trough, and lever connections between said valve and the lever mechanism within the drinking-trough, whereby the valve is opened.

My invention consists, further, in the combination, with a reservoir or source of supply, of a valve located within the reservoir, which valve is normally held in a closed position by its density or specific gravity, a drinking-trough located adjacent to the reservoir, a duct or ducts communicating between said reservoir and the drinking-trough when the valve is open, and lever mechanism actuated by the animal to open the valve against its gravity.

My invention consists, further, in the combination, with a reservoir or source of supply and a drinking-trough adjacent thereto, of a duct affording communication between said reservoir and the trough, valvular appliances controlling the entrance of the water from said reservoir to the duct, and lever mechanism supported at a point within the drinking-trough and extending through the said duct to a point of action upon the valvular appliances.

My invention consists, further, in certain details of construction and arrangements of parts to be hereinafter more particularly described, reference being now had to the accompanying drawings, in which—

Figure 1 is a plan view of my complete apparatus, the cover of the reservoir being removed. Fig. 2 is longitudinal vertical sectional view. Fig. 3 is a detail enlarged view of a portion of the communicating duct, broken away to show the valve and seat. Fig. 4 is a detail perspective view of the lever mechanism.

The numeral 10 designates a water-containing reservoir or tank having adjacent to one of its ends the drinking-trough 11, the water being prevented normally from entering the drinking-trough 11 by means of the partition 12. Affording communication at times between the reservoir 10 and the drinking-trough 11, through the partition 12, is an elbow-shaped duct 13, located within the reservoir 10, the ends of its horizontally-disposed portion opening into the drinking-trough 11 and the vertical portion projecting upwardly for a desired distance within the reservoir 10 and opening therein at its upper end. A valve-seat 14 is formed on the interior of the vertical portion of the duct 13 near the elbow of said duct, which valve-seat is faced with a leather washer 15. A valve formed of a cylindrical piece of metal 16, faced on its lower side by a section of leather or other suitable material, is seated on the valve-seat 14, the diameter of said valve being preferably less than the diameter of the vertical portion of the duct 13. An annular concentric flange 17 is formed on the lower side of the perimeter of the valve 16, which flange fits snugly yet loosely within the vertical portion of the duct 13. Notches 18 are formed in the flange 17 to permit the passage of the water through the duct.

A gate 19, formed by bending a flat piece of sheet metal, is pivotally mounted within the drinking-trough by means of the shaft 20, to which shaft said gate is journaled, said shaft being removably supported at its ends in the bearings 21 on the sides of the drinking-trough 11. A bent arm or lever 22 is fixed by one of its ends to the gate 19 and, extending through the duct 13, the other end of said arm engages with the valve 16.

The gate 19 is perforated to permit of the water in the drinking-trough being viewed from the exterior and also to permit the said water to rise through and above the gate in order that it may be readily obtained by the animal. Since the gate 19 is pivoted beyond the point of attachment of the arm 22, the said gate constitutes a lever of the second class, while the said arm constitutes a lever of the third class, and the combined action of the two constitute lever mechanism whereby the valve 16 is operated by the efforts of the animal to obtain drink.

Owing to the arrangement and position of the gate 19 relatively to the drinking-trough 11 the said gate may be readily removed, so that the trough may be cleaned, and the location of the communicating-duct 13 within the reservoir 10 at a distant point from the sides thereof the freezing of the water in and about the valve 16 is avoided.

Owing to the rigid connection between the gate 19 and the arm 22 when said gate is depressed by the animal a positive and invariable action of the valve 16 is assumed synchronously with the actuation of the lever mechanism.

It will be observed that the arm 22 being extended through the duct 13 to a point in proximity to the valve 16 auxiliary openings are unnecessary in the reservoir.

Owing to the construction and position of the valve 16 and its relation to the lever mechanism the said valve normally retains its seat and is opened against gravity and always tends to again regain its seat, thus providing means for a positive closure of the valve.

Having thus described my invention, what I claim as new therein, and desire to secure by Letters Patent, is—

1. In an automatic stock-fountain, the combination, with a reservoir and drinking-trough adjacent thereto, of an elbow-shaped duct located within the reservoir, one of the open ends of which communicates with the drinking-trough and the other with the reservoir, a gate pivoted within the drinking-trough, a valve located in or upon the duct and normally held upon its seat, and a double elbow-shaped lever-rod so connected and positioned that when the gate is acted upon the valve may be opened.

2. The combination, with a drinking-trough and reservoir adjacent thereto, of an elbow-shaped duct located within the reservoir, the ends of which open, respectively, into said reservoir and into the drinking-trough, a double elbow-shaped lever, a gate disposed within the drinking-trough, secured to a transverse shaft, a valve located within the duct and normally held upon its seat by the pressure of the water within the reservoir, said double elbow-shaped lever being fixed at one end to the gate-shaft and its other end being adapted to impinge directly against the under side of the valve, and guideways positioned within the drinking-trough, within which the gate-shaft rests and whereby the gate and lever may be removed.

CHAUNCEY I. BURT.

Witnesses:
C. C. BULKLEY,
G. R. GREEN.